United States Patent Office 3,113,837
Patented Dec. 10, 1963

3,113,837
PREPARATION OF NITROUS ACID
Clyde Stephen Scanley, Stamford, Conn., assignor to American Cyanamid Company, New York, N.Y., a corporation of Maine
No Drawing. Filed Mar. 21, 1962, Ser. No. 181,455
14 Claims. (Cl. 23—157)

The present invention relates to a process for obtaining a stabilized nitrous acid. More particularly, it relates to a process for preparing a stabilized, concentrated solution of nitrous acid free from contaminants.

As is known, nitrous acid is highly unstable. It generally exists in extremely dilute aqueous solutions, prepared by dissolving a nitrite salt, such as metal nitrite, in an aqueous mineral acid from which a mixture of nitrous acid and contaminants, such as mineral acids and salts is obtained. Removal of the contaminants is extremely difficult, if not impossible. Additionally, nitrous acid is relatively unstable in aqueous environments and is found to be in equilibrium with its decomposition products. For this reason, only extremely low concentrations in dilute aqueous solutions are possible. Further, it is also known that nitrous acid is a useful reactant in many varied organic reactions. Since such reactions are often conducted in a minimal aqueous environment, the preparation of a dilute aqueous solution of nitrous acid contaminated with mineral acids and salts cannot be readily utilized as an article of commerce. If a concentrated solution of nitrous acid in a minimal aqueous environment could be prepared, it would be highly desirable in organic synthesis.

It is a principal object of the present invention to provide a process for preparing a stabilized, uncontaminated nitrous acid solution. It is a further object to provide a stabilized, highly concentrated, uncontaminated nitrous acid solution which may be readily utilized or stored. Other objects and advantages will become apparent to those skilled in the art upon a consideration of the detailed description herein following.

To this end, it has been found that a stabilized, uncontaminated nitrous acid solution can be prepared from its corresponding water-soluble nitrite in an efficient and straightforward manner. By utilizing a cation exchange resin and passing therethrough a solution of the water-soluble nitrite dissolved in a mixture of a polar organic solvent and water at temperatures substantially below 0° C., a solution of nitrous acid, which is both uncontaminated and stable to decomposition, is readily obtained. The solution may thereafter be frozen and stored by known techniques, such as for instance by liquid nitrogen refrigeration. Alternatively, the mixture as recovered may be utilized immediately in organic synthesis.

According to the process of the instant invention, a water-soluble nitrite is dissolved in an aqueous polar solvent solution comprising between about 20% and about 80% of the polar solvent and the remainder being water. The dissolved mixture is next cooled to a temperature between about −15° C. and −60° C. and the so-cooled mixture is passed through a zone containing a cation exchange resin cooled to the aforementioned low temperatures. Resultant solution recovered contains a high concentration of nitrous acid free from contaminants.

In general, any water-soluble nitrite can be employed herein. For instance, ammonium nitrite and the nitrites of sodium, potassium, lithium, barium, strontium and lead as well as trimethyl quaternary ammonium nitrite can be utilized. However, the environment embracing solubilization of the nitrites is of critical importance. In this regard, the use of certain solubilizing polar solvents in admixture with water has been found markedly effective. Illustrative polar solvents are: ethylene glycol dimethyl ether, diethylene glycol dimethyl ether, dioxane, dimethyl ether, dimethyl sulfoxide, acetone and aliphatic alcohol containing from 1 to 4 carbon atoms, such as methanol, ethanol, isopropanol, n-butanol and ethylene glycol. When more than about 80% of the ether and less than about 20% water are utilized, solubilization of the nitrite at between −15° C. and −60° C. is found to be difficult. Thus, resultant nitrous acid solution, as treated by passing the latter through a cation exchange resin in accordance with the process of the present invention, does contain only a low concentration of the desired acid.

It has been further found that, where a mixture containing more than 80% of water and less than 20% of the polar solvent is employed as the nitrite solubilizing solution, there is no difficulty in solubilizing the nitrite. However, the latter solution cannot be so employed, for the reason that at the low operating temperatures, the solution containing the nitrite would freeze and, therefore, cannot be passed into and through the column containing the cation exchange resin.

Illustrative cation exchange resins are the type exemplified by phenol methylene sulfuric acid, commercially available as "Dowex 30" and "Amberlite," as well as the type exemplified by cross-linked, aromatic sulfonic acid, commercially available as "Dowex 50."

Advantageously, a short residence time between about two-tenths (0.2) minute and about five (5) minutes is sufficient to effect the removal of contaminants from the nitrite solution as the latter passes through the zone containing the cation exchange resin. Usually, not more than about two and one-half to three minutes are required for optimum results and ease of operation. A nitrous acid concentrate containing up to about 15% of the acid, and preferably between 2% and 10%, is so obtained in the solution recovered.

In order to facilitate a further understanding of the invention, the following examples are presented primarily for purposes of illustrating certain more specific details thereof. The scope of the invention is not to be deemed limited thereby, except as defined in the claims. Unless otherwise noted, all parts are by weight.

EXAMPLES 1–13

A suitable ion exchange column approximating 30 cm. in length and 1 cm. in diameter having a fritted glass disc in its bottom-most portion, is prepared by incorporating therein 20 milliequivalents of a cross-linked, aromatic sulfonic acid, commercially available as "Dowex 50 W–X4." Nitrogen pressure is employed at the topmost portion of the column together with three cellulose sponge spacers to separate both resin and successive solutions.

The column is washed with water, put through several regeneration cycles and then converted to the hydrogen ion form, washed thoroughly, first with water and then with the polar solvent aqueous mixture as illustrated in the table below. The exchange column is next refrigerated and maintained between −18° C. and −50° C. A solution containing designated water-soluble nitrites and polar solvent mixture is chilled to the designated temperature illustrated. The latter is introduced directly into the column. Stabilized, uncontaminated nitrous acid in good yield is recovered as an effluent.

The results are tabulated below.

Table I

| Example | Polar Solvent-Aqueous System | | Temp. of Ion-Exchange Column (° C.) | Nitrite | | | Nitrite Residence Time on Column (min.) | Nitrous Acid Recovered (Percent of Theory) |
|---|---|---|---|---|---|---|---|---|
| | Polar Solvent | Percent in Water | | Type | Wt. (in grs.) | Percent in soln. | | |
| 1 | Diglyme [1] | 22 | −18 | Na+ | 0.353 | 8.0 | 0.2 | 94.0 |
| 2 | Glyme [2] | 66 | −33 | Na+ | 0.353 | 4.6 | 1.0 | 95.3 |
| 3 | do.[2] | 66 | −33 | Pb++ | 0.770 | 12.0 | 1.0 | 93.2 |
| 4 | do.[2] | 53 | −42 | Na+ | 0.353 | 8.0 | 2.0 | 97.4 |
| 5 | do.[2] | 30 | −20 | Na+ | 0.353 | 2.5 | 2.0 | 96.5 |
| 6 | do.[2] | 55 | −40 | NH4+ | 0.327 | 18.0 | 0.4 | 93.4 |
| 7 | do.[2] | 30 | −33 | HN(CH3)3+ | 0.420 | 6.0 | 1.0 | 97.0 |
| 8 | Dioxane | 60 | −33 | Ba++ | 0.590 | 12.5 | 1.5 | 97.0 |
| 9 | Dimethyl ether | 36 | −33 | K+ | 0.435 | 18.0 | 0.4 | 97.8 |
| 10 | Dimethyl sulfoxide | 45 | −48 | Na+ | 0.353 | 12.0 | 1.0 | 96.5 |
| 11 | do | 35 | −33 | Na+ | 0.353 | 10.0 | 1.0 | 93.5 |
| 12 | Acetone | 38 | −24 | Na+ | 0.353 | 10.0 | 1.5 | 95.5 |
| 13 | Methanol | 80 | −50 | Na+ | 0.353 | 13.0 | 1.0 | 96.8 |

[1] Diethyleneglycol dimethyl ether.   [2] Ethyleneglycol dimethyl ether.

I claim:

1. In a process for preparing a stabilized nitrous acid solution free from contaminants which comprises: introducing a water-soluble nitrite in an organic polar solvent aqueous solution containing between about 20% and about 80% by weight of the organic polar solvent and the remainder being water, into and through a zone containing a cation exchange resin, maintaining said zone at a temperature between at least about −15° C. and about −60° C., and thereafter withdrawing the effluent as a stabilized nitrous acid in said solution.

2. The process according to claim 1, wherein the cation exchange resin is a cross-linked, aromatic sulfonic acid.

3. The process according to claim 1, in which the polar solvent is dimethyl sulfoxide.

4. The process according to claim 1, in which the polar solvent is ethylene glycol dimethyl ether.

5. The process according to claim 1, in which the polar solvent is diethylene glycol dimethyl ether.

6. The process according to claim 1, in which the polar solvent is dimethyl ether.

7. The process according to claim 1, in which the polar solvent is dioxane.

8. The process according to claim 1, in which the polar solvent is methanol.

9. The process according to claim 1, in which the nitrite is sodium nitrite.

10. The process according to claim 1, in which the nitrite is potassium nitrite.

11. The process according to claim 1, in which the nitrite is ammonium nitrite.

12. The process according to claim 1, in which the nitrite is barium nitrite.

13. The process according to claim 1, in which the nitrite is lead nitrite.

14. The process according to claim 1, in which the nitrite is trimethyl quaternary ammonium nitrite.

References Cited in the file of this patent

UNITED STATES PATENTS 2,334,904     Cheetham _____ Nov. 23, 1943

OTHER REFERENCES

Mellor: A Comprehensive Treatise on Inorganic and Theoretical Chemistry, vol. 8, pp. 455, Longmans Green and Co. (1928).